US007609691B2

(12) United States Patent
Hain et al.

(10) Patent No.: US 7,609,691 B2
(45) Date of Patent: Oct. 27, 2009

(54) METHOD AND SYSTEM FOR AUTOMATICALLY INTERCONNECTING IPV4 NETWORKS ACROSS AN IPV6 NETWORK

(75) Inventors: Anthony Hain, Woodinville, WA (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 11/224,209

(22) Filed: Sep. 12, 2005

(65) Prior Publication Data

US 2006/0209885 A1 Sep. 21, 2006

Related U.S. Application Data

(60) Provisional application No. 60/664,013, filed on Mar. 21, 2005.

(51) Int. Cl.
*H04L 12/56* (2006.01)
(52) U.S. Cl. ...................................... 370/389
(58) Field of Classification Search ........................ None
See application file for complete search history.

(56) References Cited

U.S. PATENT DOCUMENTS

| 7,116,681 | B1 * | 10/2006 | Hovell et al. | 370/466 |
|---|---|---|---|---|
| 7,231,452 | B2 * | 6/2007 | Ananda et al. | 370/466 |
| 7,243,161 | B1 * | 7/2007 | Tappan et al. | 370/389 |
| 7,246,175 | B1 * | 7/2007 | Tappan et al. | 370/392 |
| 2004/0088385 | A1 * | 5/2004 | Blanchet et al. | 709/220 |
| 2004/0218603 | A1 * | 11/2004 | Lee et al. | 370/390 |
| 2005/0025143 | A1 * | 2/2005 | Chen et al. | 370/389 |
| 2005/0027834 | A1 * | 2/2005 | Chen et al. | 709/222 |
| 2006/0209831 | A1 * | 9/2006 | Shepherd et al. | 370/392 |
| 2006/0248202 | A1 * | 11/2006 | Blanchet et al. | 709/227 |

OTHER PUBLICATIONS

J. Bound, "Dual Stack Transition Mechanism", RFC Proposal, Internet Draft,<draft-ietf-dstm-exp-00.txt>, Jul. 2003.
A Conta et al., "Generic Packet Tunneling in IPv6 Specification", Network Working Group RFC 2473, Dec. 1998.
B. Carpenter et al., "Connection of IPv6 Domains via IPv4 Clouds", Network Working Group, RFC 3056, Feb. 2001.
Internet Assigned Numbers Authority (IANA), "Special-Use IPv4 Addresses", Network Working Group, RFC 3330, Sep. 2002.
D. Johnson et al., Reserved IPv6 Subnet Anycast Addresses, Network Working Group, RFC 2526, Mar. 1999.

* cited by examiner

*Primary Examiner*—Anh-Vu Ly
(74) *Attorney, Agent, or Firm*—Cindy Kaplan

(57) ABSTRACT

A method and system for automatically interconnecting IPv4 networks across an IPv6 network are disclosed. The method includes receiving an IPv4 packet at an ingress router in the IPv6 network and finding the longest match IPv4 routing entry for IPv4 addresses in the received packet to identify an egress router in the IPv6 network. The IPv4 packet is encapsulated to create an IPv6 packet, wherein destination and source addresses of the encapsulated packet identify a subnet router anycast corresponding to the ingress router and the egress router in the IPv6 network. The encapsulated packet is forwarded to the egress router.

20 Claims, 4 Drawing Sheets

METHOD AND SYSTEM FOR AUTOMATICALLY INTERCONNECTING IPV4 NETWORKS ACROSS AN IPV6 NETWORK

The present application claims priority from U.S. Provisional Application No. 60/664,013, entitled METHOD AND SYSTEM FOR INTERCONNECTING IPv4 NETWORKS ACROSS IPv6 NETWORK and filed on Mar. 21, 2005. The contents of this provisional application are incorporated herein by reference in its entirety.

BACKGROUND OF THE INVENTION

The present invention relates generally to data networking and, more specifically, to a method and system for automatically interconnecting IPv4 networks across an IPv6 network.

To accommodate the explosive growth of the Internet, a very large number of network nodes have been configured to employ IP (Internet Protocol). These nodes range from user workstations to very high throughput core routers.

The Internet engineering community has been implementing a shift from IPv4 to IPv6. Advantages of IPv6 include an enormous expansion in the available address space to accommodate both greater ubiquity of Internet-enabled devices as well as less reliance on cumbersome network address translation schemes which have been utilized to conserve addresses. IPv6 also provides highly useful auto-configuration capabilities.

There is, therefore, a need for a method for providers to automatically handle IPv4 traffic for their clients across a network they choose to deploy as IPv6-only network. There has been work in developing methods to work with individual IPv4 nodes existing in an IPv6-only network. For example, "Dual Stack Transition Mechanism" (Bound, Jul. 2003, draft-ietf-bound-dstm-exp-00.txt), addresses individual IPv4 nodes in an IPv6 only network. However, this document does not address automatically handling entire networks of IPv4 nodes across an IPv6-only network.

SUMMARY OF THE INVENTION

A method and system for automatically interconnecting IPv4 networks across an IPv6 network are disclosed. The method includes receiving an IPv4 packet at an ingress router in the IPv6 network and finding the longest match IPv4 routing entry for IPv4 addresses in the received packet to identify an egress router in the IPv6 network. The IPv4 packet is encapsulated to create an IPv6 packet, wherein destination and source addresses of the encapsulated packet identify a subnet router anycast corresponding to the ingress router and the egress router in the IPv6 network. The encapsulated packet is forwarded to the egress router.

In another aspect of the invention, a method for automatically interconnecting IPv4 networks across an IPv6 network generally comprises forwarding an IPv4 packet from a first IPv4 network to an ingress router in the IPv6 network and creating a tunnel in the IPv6 network for transferring the packet across the IPv6 network. Tunnel endpoints are defined as an IPv6 subnet router anycast corresponding to the ingress router and an egress router. The method further includes encapsulating the IPv4 packet to create an IPv6 packet, forwarding the encapsulated packet to the egress router, decapsulating the packet at the egress router, and forwarding the packet to a second IPv4 network. Further understanding of the nature and advantages of the inventions herein may be realized by reference to the remaining portions of the specification and the attached drawings.

DESCRIPTION OF SPECIFIC EMBODIMENTS

Figure 1:
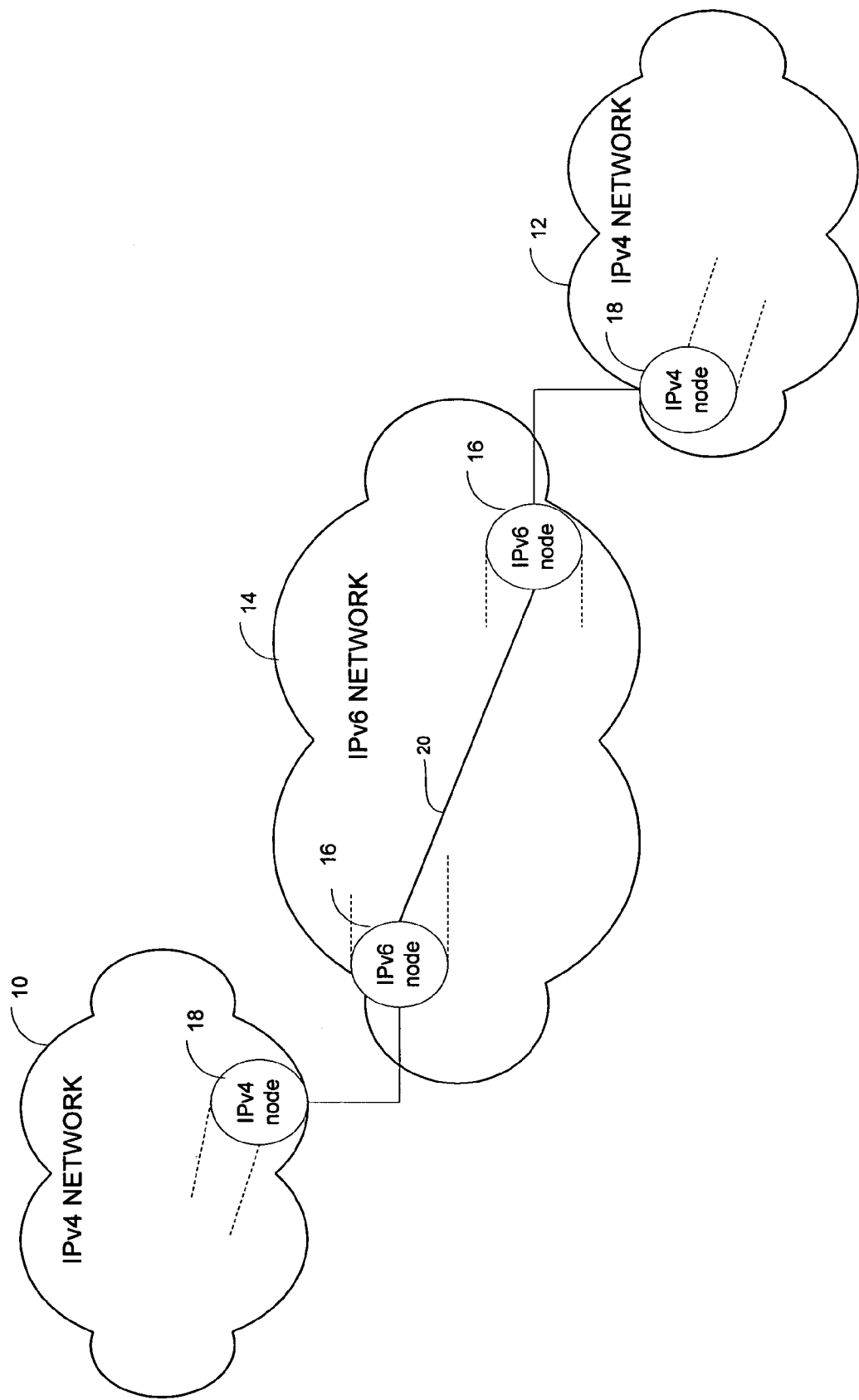
FIG. 1 depicts IPv4 networks in communication with an IPv6 network.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers. For example, some of the nodes may be specially configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus (e.g., a PCI bus). The CPU preferably includes memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling operations of the router. Memory can be non-volatile RAM or ROM. However, there are many different ways in which memory could be coupled to the system. A router may be implemented on a general purpose network host machine such as a computer system, or network device described below with respect to FIG. 4.

The system and method described herein allow operators of IPv6-only networks to automatically provide a transparent transit service for IPv4-only networks. The present invention allows for the interconnection of entire IPv4 networks through an IPv6 network, rather than just individual IPv4 nodes. The invention may be implemented on routers to enable customers to deploy IPv6-only networks while still supporting their IPv4-only customers. Internet Service Providers can also use the method and system to deploy IPv6-only network backbones while transparently interconnecting their IPv4 customer networks. The present invention may also be used to support IPv4 network pockets around the edge of any IPv6-only portions of the service provider's overall network.

FIG. 1 depicts a networking environment suitable for implementing one embodiment of the present invention. FIG. 1 shows two IPv4 networks 10, 12 in communication with an IPv6 network 14. The IPv6 network 14 includes IPv6 nodes 16 which implement IPv6 layer functionality and the IPv4 network includes IPv4 nodes 18. For clarity of depiction, only edge routers are shown in FIG. 1 and interior nodes are omitted. The edge nodes 16 at the ingress and egress of the IPv6 network are in communication with the IPv4 networks 10, 12 and the edge nodes 18 of the IPv4 networks 10 are in communication with the IPv6 network. The edge nodes 16 are referred to herein as IPv4/IPv6 border routers. It is to be understood that the network shown in FIG. 1 is only one example of a network in which the method and system of the present invention may be used, and that the network may have different configurations without departing from the scope of the invention.

The method and system are used to automatically determine IPv6 tunnel endpoints when interconnecting IPv4 networks 10, 12 across IPv6-only network 14. As shown in FIG. 1, the tunnel 20 extends between edge routers 16 in IPv6 network 14. The tunnel 20 may pass through any number of IPv6 nodes (not shown) within the IPv6 network 14. The system does not require manual tunnel configuration. Only the routers 16, 18 at the border between the different protocol versions are aware of the other networks traffic. IPv6-only routers are unaware of the IPv4 traffic, while IPv4-only routers are unaware of the intermediate IPv6-only infrastructure.

The IPv6 addresses of the tunnel endpoints are automatically derived using a subnet router anycast. The anycast address allows a packet to be routed to one of a number of different nodes all responding to the same address. A router that injects a routing update into the IPv6 network takes on the role of subnet router for the entire injected IPv6 prefix. The encapsulating header destination and source addresses identify the subnet router anycast that corresponds to a new prefix (referred to herein as a connection prefix)+IPv4 prefix. In order to find a corresponding egress router, the ingress router identifies the longest match IPv4 routing entry for the IPv4 addresses in the packet to be encapsulated, as described below.

The connection prefix is a locally defined prefix. Any prefix that is not otherwise being used for IPv6 routing within the IPv6-only routing domain may be used as the connection prefix. The connection prefix is preferably equal to or shorter than 128 minus the longest active IPv4 routing prefix length. One example of a connection prefix is to use a specifically undefined /32 value in the IPv6 global space (e.g., 2002:7FFF:/32). This value is undefined based on the combined definitions of RFC 3056 ("Connection of IPv6 Domains via IPv4 Clouds", B. Carpenter et al., February 2001) and RFC 3330 ("Special-Use IPv4 Addresses", IANA, September 2002). It is to be understood that the prefix may have a length or configuration different than described herein, without departing from the scope of the invention.

Figure 2:
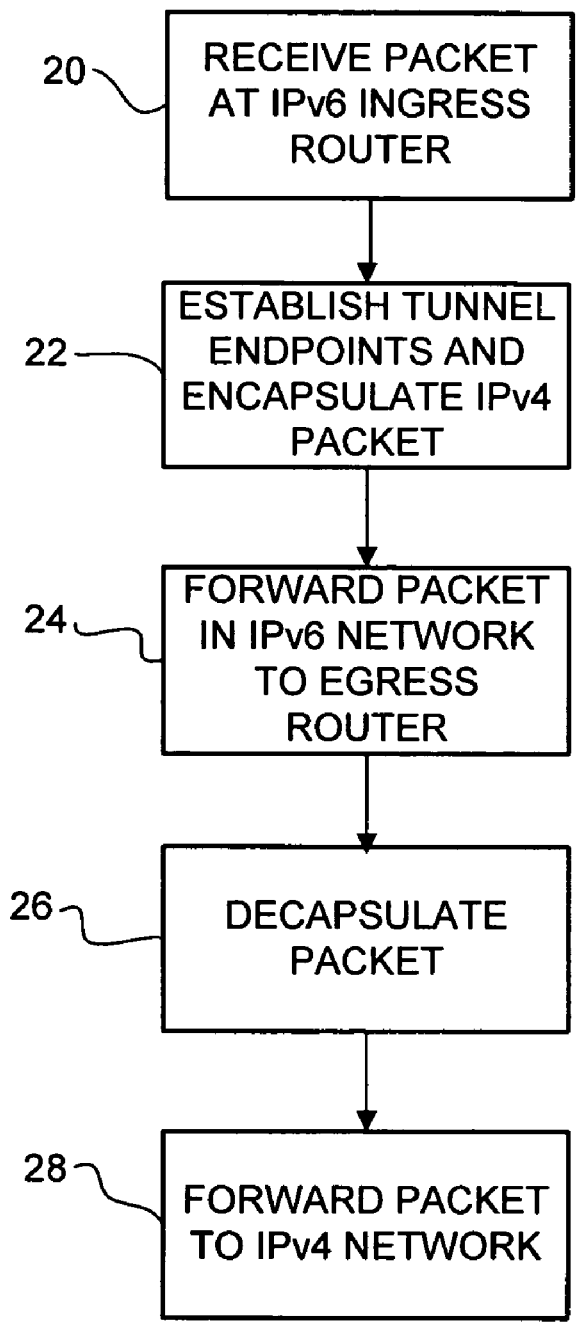
FIG. 2 is a flowchart illustrating a process according to one embodiment of the present invention for transferring packets from one of the IPv4 networks to the other IPv4 network across the IPv6 network, as shown in FIG. 1.

FIG. 2 illustrates a method for handling packets received at an ingress router 16 of the IPv6 network 14 from one of the IPv4 networks 10, 12. The packet is received at ingress router 16 at step 20. The tunnel endpoints are established and the IPv4 packet is encapsulated in an IPv6 packet (step 22). Details of this step are described below with respect to the flowchart of FIG. 3. In one embodiment, the router performs basic packet encapsulation procedures according to RFC 2473 ("Generic Packet Tunneling in IPv6 Specification", A. Conta et al., December 1998), which is incorporated herein by reference in its entirety.

The resulting IPv6 packet is forwarded in the IPv6-only network 14 to the egress router 16 using normal IPv6 services (step 24). At the IPv4/IPv6 border router 16 on egress from the IPv6-only network 14, the IPv6 header is stripped off (step 26) and the remaining IPv4 packet is forwarded in the IPv4 network using normal IPv4 services (step 28). If the local administration chooses to expose the IPv6-only hop count to the IPv4 nodes 18, the egress router 16 will need to copy the hop count back from the IPv6 header to the IPv4 TTL and re-checksum.

Figure 3:
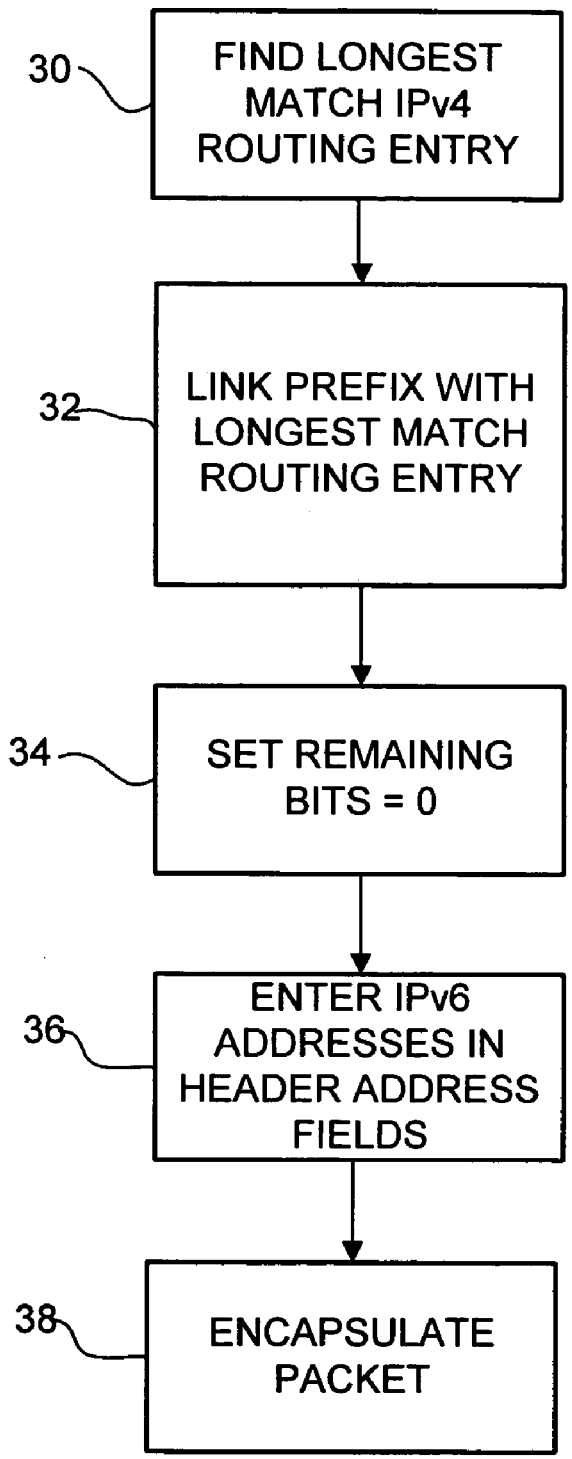
FIG. 3 is a flowchart illustrating details of a step for establishing tunnel end points in the flowchart of FIG. 2.

The flowchart of FIG. 3 expands on step 22 of FIG. 2 and illustrates how the IPv6 addresses are created to establish the tunnel endpoints. The tunnel endpoint addresses are defined as the IPv6 subnet router anycast corresponding to the ingress and egress router. At step 30, the router finds the longest match IPv4 routing entry for the IPv4 addresses in the packet to be encapsulated to automatically find the corresponding IPv6 egress router. At the IPv4/IPv6 border router on ingress into the IPv6-only network, IPv6 addresses are created by concatenating the connection prefix with the longest match IPv4 routing entry corresponding to both the received destination and source IPv4 addresses to create the corresponding IPv6 prefix value (step 32). The remaining bits in each address are set to 0 to indicate the IPv6 destination or source is the subnet router anycast for this particular IPv6 prefix (step 34). This process automatically establishes the tunnel end points at the router or routers that injected the routing update covering any specific IPv4 address.

Following the encapsulation procedure, the resulting IPv6 addresses are entered into the corresponding destination and source address field in an IPv6 header that will be used to encapsulate the entire original IPv4 packet (steps 36 and 38). The appropriate IPv4 fields are copied as follows:

IPv4 Type-of-Service to the IPv6 Traffic-class (though local policy may set a specific value for the IPv6 traffic class);

IPv4 Total-length to IPv6 Payload-length; and

IPv4 Time-to-Live to IPv6 Hop-count.

The next protocol field of the IPv6 header is set to 4 to indicate the payload is the IPv4 packet.

A router does not encapsulate packets when it is not the appropriate return path egress router for the source address (i.e.; spoofed IPv4 source).

The logical link MTU (Maximum Transmission Unit) is preferably 1280 bytes to avoid the possibility of exceeding the MTU of any internal IPv6-only link. This means that on ingress the IPv4 side of the border router follows IPv4 fragmentation rules as if this were any other IPv4 link with 1280 bytes MTU.

The following describes how ICMP (Internet Control Message Protocol) messages are handled, including ICMP messages originating in IPv4 portions of the network, ICMP messages generated due to processing at the ingress IPv4/IPv6 border router, and ICMP messages generated in the IPv6 network.

In the case where the ICMP messages originate in the IPv4 portions of the network, they are encapsulated and handled as any other IPv4 packet.

In the case where the ICMP message is generated due to processing in the ingress IPv4/IPv6 border router, the router acts in its IPv4 role so normal IPv4 ICMP rules apply. Unless explicitly configured otherwise, if the IPv4 packet is larger than 1240 bytes and the DF (don't fragment) bit is set, a Type 3 Code 4 message is returned.

In the case where ICMP messages are generated in the IPv6-only network in response to encapsulated IPv4 packets, the destination of the ICMP is the ingress IPv4/IPv6 border router (identified by the encapsulating IPv6 source address). Any packets where the IPv6 source address is not a subnet router anycast for the encapsulated IPv4 source address are preferably silently dropped as spoofed within the IPv6-only part of the network. Depending on the ICMP message type the encapsulating router may take the appropriate action, or return a corresponding ICMP message to the originating IPv4 node. Examples of IPv6 values are shown below in the format:

Type Function (with a brief description below each example).

1 No Route to Destination

Indicates no path to the egress router. Ingress router returns IPv4 ICMP Type 3 Code 0 with original IPv4 to IPv4 source address.

2 Packet Too Big

Indicates ingress IPv4 router failed to fragment appropriately. This error is avoided if the ingress routers treat this as a logical link with a 1280 byte MTU, though it may occur if the network is being explicitly managed for a larger MTU and an ingress router is misconfigured for a larger value than the rest of the network. If the DF bit was set on the IPv4 packet, the ingress encapsulation processing will preferably catch it before the packet is forwarded into the IPv6 network.

3 Time Exceeded

Indicates that it did not reach the egress router. Ingress router returns IPv4 Type 11 Code 0. Local policy concerning exposing the IPv6 nodes is used to determine if the hop count of the IPv6 header is copied to the TTL of the IPv4 ICMP before being returned.

4 Parameter Problem

This should not happen because the environment is a contained network of consistently administered routers. If the IPv6 environment spans multiple administrations this error may occur, though the target of any such parameter problems will be the encapsulating ingress router so any message to the originating IPv4 node will not be a direct result of this IPv6 ICMP type.

The following describes a method for routing updates. In the described embodiment of the invention, the method assumes CIDR (Classless Inter Domain Routing) style IPv4 routing where subnet masks are contiguous and the routing prefix can also be defined as a value and length.

When a route is learned via an IPv4 routing update, the connection prefix is prepended to the entry, the connection prefix length is added to the learned prefix length, and the resulting value is entered as a routing update on the IPv6 side.

When a route in the connection prefix is learned via an IPv6 update, the connection prefix is stripped off, the connection prefix length is subtracted from the learned prefix length, and the resulting value is entered as a routing update on the IPv4 side.

In the case of a static default IPv4 route at a border router, that border router will be configured with a specific IPv6 destination as appropriate for the local network. This is not likely to see widespread use because the default IPv6 router will also need corresponding static IPv4 to IPv6 egress mappings for every IPv4 prefix, though it will work well for environments that already use static IPv4 routing.

Interactions between network administrations are preferably done at a purely IPv4 level, with each party using the method internally as appropriate. This presents the appearance of a native IPv4 network, just as if it were native IPv4 routers connected via an underlying multi-point Frame Relay or ATM network.

In order to avoid security implications, the locally defined prefix is preferably explicitly blocked through any external route peering, and any IPv6 customer connections preferably have active filtering to drop packets containing the prefix as a source address.

Figure 4:
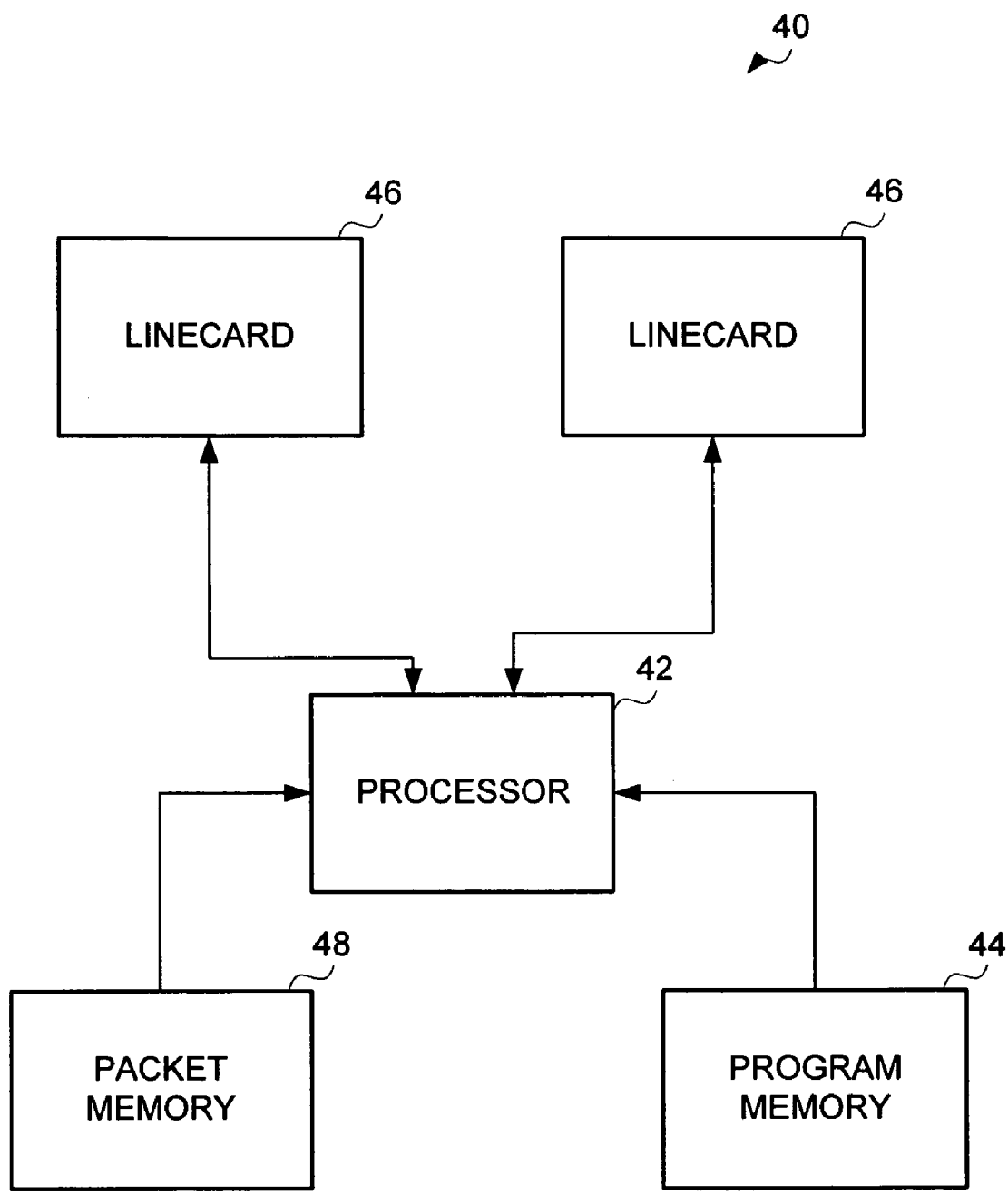
FIG. 4 depicts a network device useful in implementing embodiments of the present invention.

FIG. 4 depicts a network device 40 that may be used to implement the method and system described above. In one embodiment, network device 40 is a programmable machine that may be implemented in hardware, software, or any combination thereof. A processor 42 executes code stored in a program memory 44. Program memory 44 is one example of a computer-readable medium. Program memory 44 can be a volatile memory. Another form of computer-readable medium storing the same codes may be some type of non-volatile storage such as floppy disks, CD-ROMs, DVD-ROMs, hard disks, flash memory, etc.

Network device 40 interfaces with physical media via a plurality of linecards 46. As packets are received, processed, and forwarded by network device 40, they may be stored in a packet memory 48. Packet transmission operations may occur partially or completely within one of the linecards 46. To implement functionality according to the present invention, linecards 46 may incorporate processing and memory resources similar to those discussed above in connection with the network device as a whole. Network device 40 implements all of the features provided by the present invention.

Network device 40 shown in FIG. 4 is only one example of a computer system suitable for use with the invention. Other devices and systems having different configurations of subsystems may also be utilized. Communication between computers within the network is made possible with the use of communication protocols, which govern how computers exchange information over a network.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for automatically interconnecting IPv4 networks across an IPv6 network, the method comprising:
receiving an IPv4 packet at an ingress router in the IPv6 network, wherein the ingress router is located at an edge of the IPv6 network and is in communication with one of the IPv4 networks;
finding a longest match IPv4 routing entry for IPv4 addresses in the received packet at the ingress router, to identify an egress router in the IPv6 network;
encapsulating at the ingress router, the IPv4 packet to create an IPv6 packet, wherein destination and source addresses of the encapsulated packet identify a subnet router anycast corresponding to the ingress router and the egress router in the IPv6 network; and
forwarding at the ingress router, the encapsulated packet over the IPv6 network via IPv6-only routers to the egress router.

2. The method of claim 1 further comprising concatenating a prefix with the longest match IPv4 routing entry to create a IPv6 prefix value.

3. The method of claim 2 further comprising setting remaining bits in IPv6 address to zero.

4. The method of claim 1 wherein the encapsulated packet includes a traffic-class field, payload-length field and hop-count field.

5. A method for transmitting packets from a first IPv4 network to a second IPv4 network across an IPv6 network, the method comprising:
   receiving an IPv4 packet at an ingress router in the IPv6 network;
   creating a tunnel in the IPv6 network for transferring the packet across the IPv6 network, comprising defining tunnel endpoint addresses as an IPv6 subnet router anycast corresponding to the ingress router and an egress router;
   encapsulating the IPv4 packet to create an IPv6 packet at the ingress router in the IPv6 network;
   forwarding the encapsulated packet from the ingress router to the egress router over said tunnel;
   decapsulating the packet at the egress router; and
   forwarding the packet from the egress router to the second IPv4 network;
   wherein at least one of the first and second IPv4 networks comprises an IPv4-only network.

6. The method of claim 5 wherein defining tunnel endpoints further comprises finding a longest match IPv4 routing entry corresponding to destination and source IPv4 addresses in the received IPv4 packet.

7. The method of claim 5 wherein decapsulating the packet comprises removing an IPv6 header.

8. The method of claim 5 further comprising copying a hop-count from an IPv6 header in an encapsulated header of the encapsulated packet to an IPv4 time-to-live field.

9. The method of claim 5 further comprising concatenating a prefix with a longest match IPv4 routing entry to create a IPv6 prefix value.

10. The method of claim 5 wherein encapsulating the IPv4 packet comprises encapsulating ICMP messages originating in the second IPv4 network.

11. The method of claim 5 wherein a logical link maximum transmission unit is 1280 bytes.

12. A computer readable medium encoded with a computer program product comprising computer executable code for automatically interconnecting IPv4 networks across an IPv6 network, comprising:
   code that receives an IPv4 packet at an ingress router in the IPv6 network, wherein the ingress router is located at an edge of the IPv6 network and is in communication with one of the IPv4 networks;
   code that finds a longest match IPv4 routing entry for IPv4 addresses in a received IPv4 packet at an ingress router of the IPv6 network, to identify an egress router in the IPv6 network;
   code that encapsulates the IPv4 packet to create an IPv6 packet at the ingress router of the IPv6 network, wherein destination and source addresses of the encapsulated packet identify a subnet router anycast corresponding to an ingress router and the egress router in the IPv6 network; and
   code that forwards at the ingress router, the encapsulated packet over the IPv6 network via IPv6-only routers to the egress router;
   wherein the IPv4 packet is received from an IPv4-only network.

13. The computer readable medium of claim 12 further comprising code that creates a locally defined prefix and connects the prefix with the longest match IPv4 routing entry to create an IPv6 prefix value.

14. Apparatus for automatically interconnecting IPv4 networks across an IPv6 network, the apparatus comprising:
   means for receiving an IPv4 packet at an ingress router in the IPv6 network, wherein the ingress router is located at an edge of the IPv6 network and is in communication with one of the IPv4 networks;
   means for finding a longest match IPv4 routing entry for IPv4 addresses in the received packet at the ingress router to identify an egress router in the IPv6 network;
   means for encapsulating the IPv4 packet to create an IPv6 packet at the ingress router, wherein destination and source addresses of the encapsulated packet identify a subnet router anycast corresponding to the ingress router and the egress router in the IPv6 network; and
   means for forwarding the encapsulated packet at the ingress router, over the IPv6 network via IPv6-only routers to the egress router.

15. The apparatus of claim 14 further comprising means for creating a locally defined prefix and connecting the prefix with the longest match IPv4 routing entry to create an IPv6 prefix value.

16. The apparatus of claim 14 further comprising means for concatenating a prefix with the longest match IPv4 routing entry to create an IPv6 prefix value.

17. The apparatus of claim 16 further comprising means for setting remaining bits in IPv6 address to zero.

18. The apparatus of claim 14 wherein the encapsulated packet includes a traffic-class field, payload-length field and hop-count field.

19. The method of claim 1 further comprising creating a locally defined prefix and connecting the prefix with the longest match IPv4 routing entry to create an IPv6 prefix value.

20. The computer readable medium of claim 12 further comprising code for concatenating a prefix with the longest match IPv4 routing entry to create an IPv6 prefix value.

* * * * *

UNITED STATES PATENT AND TRADEMARK OFFICE
CERTIFICATE OF CORRECTION

PATENT NO. : 7,609,691 B2 Page 1 of 1
APPLICATION NO. : 11/224209
DATED : October 27, 2009
INVENTOR(S) : Hain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 392 days.

Signed and Sealed this

Twelfth Day of October, 2010

David J. Kappos
*Director of the United States Patent and Trademark Office*